US006270213B1

(12) United States Patent
Sansone et al.

(10) Patent No.: US 6,270,213 B1
(45) Date of Patent: *Aug. 7, 2001

(54) FLUORESCENT AND PHOSPHORESCENT INK FOR USE WITH AN INFORMATION BASED INDICIA

(75) Inventors: Ronald P. Sansone, Weston; Richard A. Bernard, Norwalk; Judith D Auslander, Westport, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/164,510

(22) Filed: Sep. 30, 1998

(51) Int. Cl.[7] .................................................. G01D 11/00
(52) U.S. Cl. .......................... 347/100; 347/101; 235/468; 235/470
(58) Field of Search ..................................... 347/100, 101; 235/468; 106/31.14

(56) References Cited

U.S. PATENT DOCUMENTS

| 5,554,842 | | 9/1996 | Connell et al. ........................ 235/491 |
| 5,569,317 | * | 10/1996 | Sarada et al. ......................... 347/100 |
| 5,837,042 | * | 11/1998 | Lent et al. ........................... 106/31.14 |
| 6,039,257 | * | 3/2000 | Berson et al. ......................... 235/468 |
| 6,054,505 | * | 4/2000 | Gundlach et al. ..................... 523/160 |
| 6,108,643 | * | 8/2000 | Sansone ................................. 705/62 |

* cited by examiner

Primary Examiner—John Barlow
Assistant Examiner—M. Shah
(74) Attorney, Agent, or Firm—Ronald Reichman; Michael E. Melton

(57) ABSTRACT

A ink that is printed under a printed information-based indicia so that the information-based indicia will not require a Facing Identification Mark (FIM). The ink provides the foregoing result by being both fluorescent and phosphorescent. Current desk top printers and color photocopiers are not capable of duplicating fluorescence and phosphorescence at the same time.

6 Claims, 2 Drawing Sheets

FLUORESCENT AND PHOSPHORESCENT INK FOR USE WITH AN INFORMATION BASED INDICIA

CROSS REFERENCE TO RELATED APPLICATIONS

Reference is made to commonly assigned co-pending patent applications: now U.S. Pat. No. 6,142,380 filed herewith entitled "Usage Of Dual Luminescent Inks To Produce An Orienting and Sorting Identification Mark For An Information-Based Indicia" in the names of Ronald Sansone, Richard Bernard and Judith Auslander.

FIELD OF THE INVENTION

The invention relates generally to the field of inks, and more particularly to luminescent inks that are used to indicate that postage has been paid or to protect certain information.

BACKGROUND OF THE INVENTION

Soon small business mailers may be able to use their desktop computer (personal computer) and printer to apply postage directly onto envelopes or labels while applying an address. The United States Postal Service Engineering Center recently published a notice of proposed specification that may accomplish the foregoing. The title of the specification is Information Based Indicia Program Postal Security Device Specification, dated Jun. 13, 1996. The Information Based Indicia Program specification includes both proposed specifications for the new indicium and proposed specifications for a postal security device (PSD). The proposed Information-Based Indicia (IBI) consists of a two-dimensional bar code containing hundreds of bytes of information about the mail piece and certain human-readable information. The indicium includes a digital signature to preclude the forgery of indicia by unauthorized parties. The postal security device is a unique security device that provides a cryptographic digital signature to the indicium and performs the function of postage meter registers.

Current United States Postal Service IBI specifications require a Facing Identification Mark (FIM) to be part of the IBI indicia so that the USPS Advanced Facer Canceller may detect the presence of an IBI mail piece so as to sort the mail piece properly. In the United States, the FIM is a pattern of vertical bars printed in the upper right portion of the mail piece, to the left of the indicia. A FIM pattern is essentially a nine bit code consisting of bars and no bar place holders. The presence of a bar can be considered a binary one "1" and the absence of a bar a binary "0". Thus, as currently specified, the United States Postal Service FIM is large, taking up about approximately 20% of the proposed IBI indicia.

Personal computer printers have difficulty in reliably printing the FIM portion of the IBI indicia. The reason for the foregoing is that the FIM is located near the top edge of the envelope and it is difficult for personal computer printers to print near the top edge of the envelopes. Furthermore, the FIM carries low information density when compared to other data elements of an IBI indicia. A disadvantage of the prior art is that a FIM wastes a large amount of envelope space.

Another disadvantage of the prior art is that it is difficult for personal computer printers to print an IBI indicia in proper registration to a pre printed FIM.

For many years the United States Postal Service and other Postal Services have been selling stamps that are printed with phosphorescent inks. The Postal Services also require and accept postal indicia that have been printed by a postage meter that uses fluorescent inks. Current fluorescent inks that are used in postage meters, approved by the United States Postal Service, contain a fluorescent ink that is excited by a 254 nm ultraviolet light source that emits a fluorescent light in the orange to red region of the visible spectrum between 580 to 650 nm.

Typically, luminescence will become visible to the naked eye when stimulated or excited by suitable radiation. Fluorescent inks and phosphorescent inks are types of luminescent inks. The emission of light from a fluorescent ink is caused by the absorption of energy (light or electromagnetic radiation) into the inks molecules, causing the ink molecules to be in an excited state and to emit or be fluorescent. The fluorescence ceases abruptly when the energy source is removed. The emission of light from a phosphorescent ink will persist after a time interval in which the energy source has been removed.

Mail sorting equipment like the Advanced Facer Canceling System manufactured by Siemens Electrocom, are being used at postal incoming mail processing stations to detect, cancel and then sort, using the phosphorescent stamps that have been affixed to mail pieces. These systems also check whether or not the postal indicia affixed to mail pieces were affixed by an authorized postal meter i.e., whether or not the indicia is fluorescent. The United States Postal Service Advanced Facer canceller System faces (arranges mail so all addresses and indicia are facing the same way), cancels the stamps bearing mail, and then sorts letter mail into three mail streams: pre bar coded letters; OCR readable (typed/machine imprinted) letters, and hand written or script letters.

Another problem encountered by the prior art is the forging of government and private documents. The prior art made it more difficult to forge documents by printing information on documents with luminescent and black inks.

SUMMARY OF THE INVENTION

The present invention overcomes the disadvantages of the prior art by providing a ink that is printed under a printed information based indicia so that the information based indicia will not require a FIM. The ink provides the foregoing result by being both fluorescent and phosphorescent. Current desk top printers and color photocopiers are not capable of duplicating fluorescence and phosphorescence at the same time. The reason for the above is that while fluorescent inks would add to the brightness of the printing, phosphorescence would not add any enhancement to the print quality. Hence, phosphorescent materials are currently only used in specialty inks.

This invention also makes it more difficult to forge government and private documents. The invention accomplishes the forgoing by printing information on a document with a lower level luminescent ink and printing additional information in an upper level with a colored ink.

DETAILED DESCRIPTION OF THE PREFERRED EMBODIMENT

Figure 1:
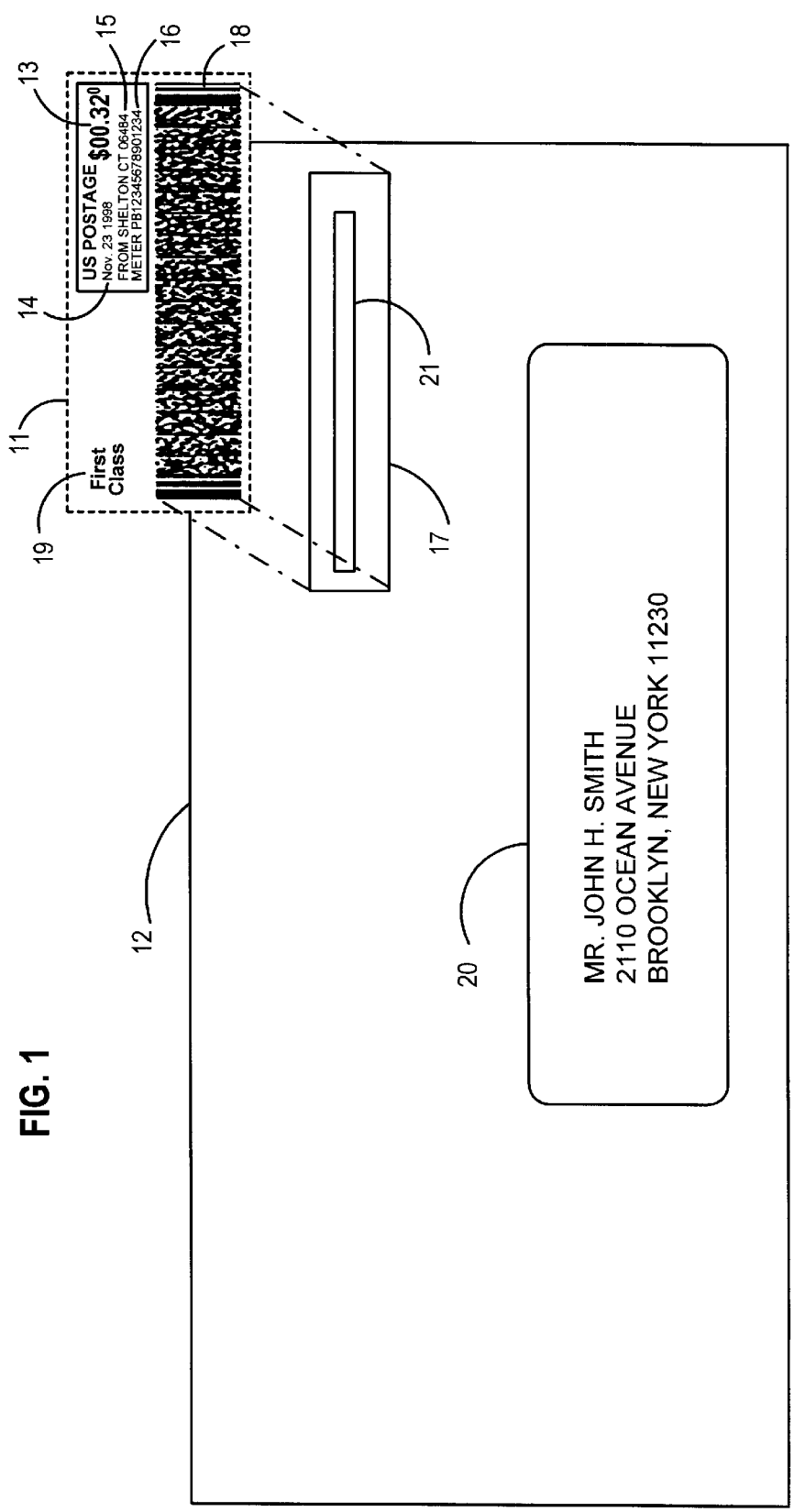
FIG. 1 is a drawing of a upper layer IBI indicia printed over a pre-printed lower layer dual luminescent ink.

Referring now to the drawings in detail and more particularly to FIG. 1, the reference character 11 represents a USPS Information—Based Indicia (IBI) that was printed on mail piece 12 by a printer. The postal indicia 11 contains a dollar amount 13, the date 14 that the postal indicia was affixed to the mail piece, the place the mail piece was mailed from 15, the postal meter serial number 16, a 2-D encrypted bar code 18. Mail piece 12 also contains an indication 19 of the class of mail piece 12. Indicia 11 is printed over area 17 in a manner that 2-D encrypted bar code 18 will be an upper layer that will be directly printed over lower layer area 17. Area 17 contains a portion 21. Portion 21 is printed with a dual luminescent ink.

Mail piece 12 is going to be sent to the person and place indicated in address field 20.

A dual luminescent ink is used so that the Advanced Facer Canceller System will receive enough signal to trigger its sortation capabilities. The facer canceller may be set to recognize and sort a mail piece having a dual luminescent ink as a new form of mail, that exhibits the green or red phosphorescence of a stamp and the fluorescence of a postal indicia. The facer canceller may let the mail piece enter the mail system if the facer canceller detects the dual luminescent ink. A facer canceller will: cancel a phosphorescent stamp; will not cancel a fluorescent postal indicia; and remove other mail pieces that do not have FIMs or dual luminescent inks.

The ink that is used to print 2-D encrypted bar code 18 must be dark enough (low reflectivity) so that when it is printed on top of portion 21, it may be read. An example of an ink that may be used to print 2-D encrypted bar code 18 by conventional printing methods is the ink contained in the Hewlett Packard 51626A black ink cartridge.

Figure 2:
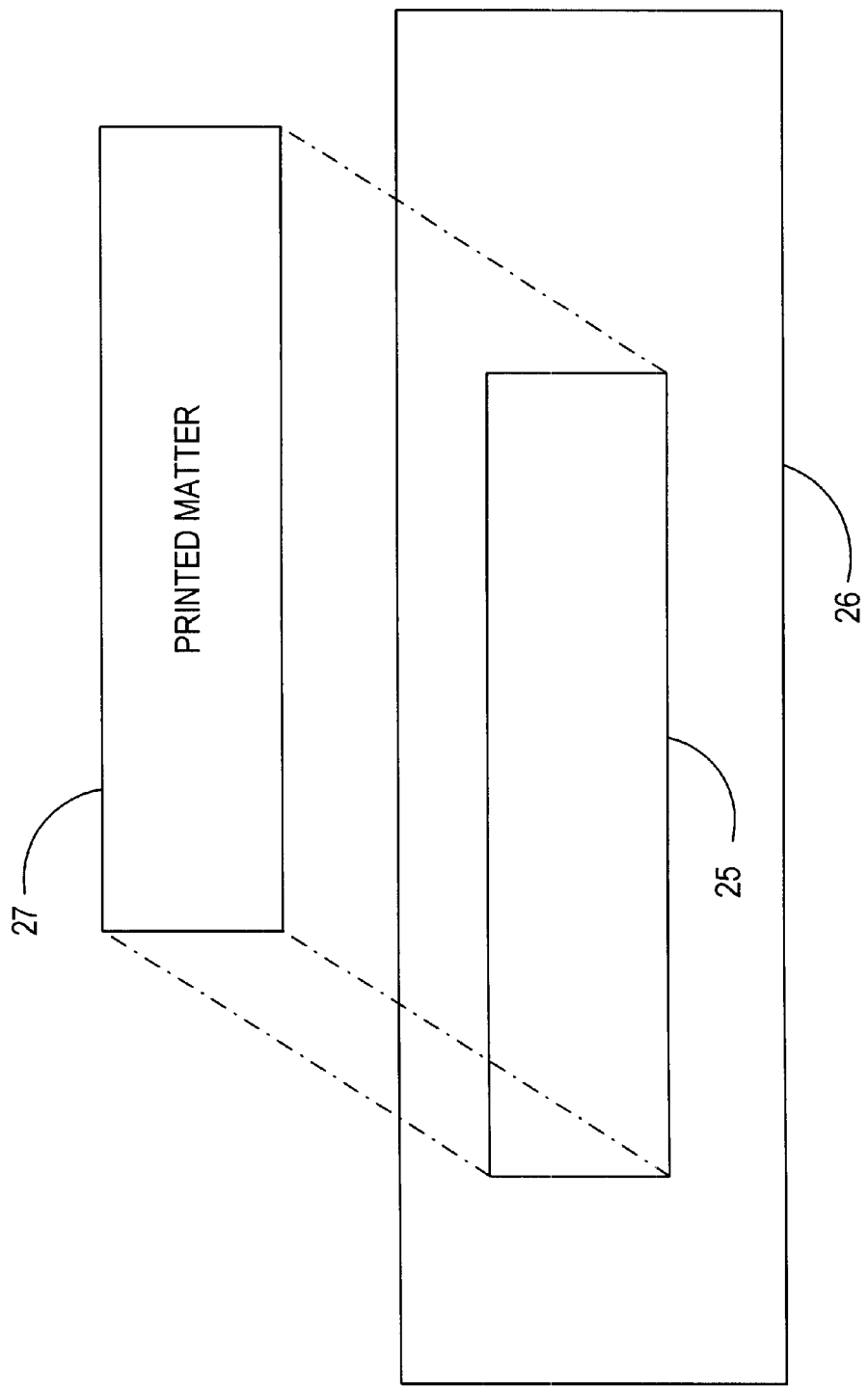
FIG. 2 is a drawing of upper layer human readable information printed over a preprinted lower layer dual luminescent ink.

FIG. 2 is a drawing of upper layer human and machine readable information printed over a preprinted lower layer dual luminescent ink. A portion of area 25 of document 26 is printed with a dual luminescent ink. Human and machine readable printed matter 27 is printed over area 25. Printed matter 27 is printed over area 25 with a standard black ink, like the ink contained in the Hewlett Packard 51626A black ink cartridge.

The components of the dual luminescent ink of this invention are as follows:

Component: Aqualope Transparent White

Is manufactured by Environmental Inks and Coatings of 1 Quality Products Road,

Morganton, N.C.

Aqualope Transparent White is a water-borne mixture commonly used in the envelope industry as a base material containing colorants are which are printed on envelope stock.

Color: milk white

Wt. Per Gallon 8.8+/−0.2

Gloss 60 degree Angle 15–20

Odor: ammoniacal

Solids: 30–40%

Ph: 8.3–8.8

Pkg. Viscosity, 33 Zahn 30–40 seconds at 25° C.

Component: Lumilux Red CD 331

Is manufactured by Riedel-de Haen, a subsidiary of Allied Signal Inc., Specialty Chemicals, of 101 Columbia Road, Box 1139, Morristown, N.J. 07962.

Lumilux Red CD 331 is an organic luminescent pigment that is used for security coding. It is also used for fluorescent screen and gravure printing inks.

Composition: Europium chelate

Solubilities at 20° C.

Acetone>1000 g/l

Dibutylphthalate 99 g/l

Ethyl Acetate 918 g/l

Ethanol 41 g/l n-Hexane, 1 g/l

Toluene 164 g/l

Water, 1 g/l

Appearance: Yellowish

Melting Point: 170–180° C.

Excitation: UV Radiation

Color of fluorescence: Reddish orange

CIE—chromaticity coordinates determined on powder $X=0.655+/-0.01$ $Y=0.345=/-).01$ Acid Red 52 (Sulforhodamine B)

Acid Red 52 is manufactured by Adrich Chemical of 1001 West Saint Paul Avenue, Milwaukee, Wis. 53233.

C.I. 45100

FW 580.66

The procedure for preparing the dual luminescent ink of this invention and the proprieties of the ink are as follows:

PROCEDURE

1) Weigh Acid Red 52 and Lumilux Red CD 331 separately.
2) Weigh Aqualope Transparent White separately.
3) Pour Acid Red 52 and Lumilux Red CD 331 into wide mouth bottle.
4) Pour Aqualope Transparent White over Acid Red 52 and Lumilux Red CD 331 into container for final mix.
5) Magnetically stir at 100 RPM.

6) Apply coating to mail piece with straight blade applicator.
7) At ambient temperature, dry coating for four hours.
8) Measure coating with PMU meter.
9) Print over the coating with a Hewlett Packard Desk Jet Plus printer @ 300 dots per inch using a Hewlett Packard 51626A (black) cartridge.
10) Measure the coating with a PMU meter below the printed Datamatrix.
11) Use the Datamatrix Uniform Symbology system with the Datamatrix Acuity 930 powervision scanner to read the datamatrix symbols. The Datamatrix Uniform Symbology system and the Datamatrix Acuity 930 powervision scanner are manufactured by C; Matrix of 20 Trafalgar Square, Suite 454, Nashua, N.H. 03063.
12) Determine the percent error code correction used to read the matter printed with the black ink.
13) Measure the spectral peak of the coating.

EXAMPLE 1

Ink Preparation

| Ingredient | Weight % |
|---|---|
| Aqualope Transparent White | 99.3 |
| Lumilux Red CD 331 | 0.6 |
| Acid Red 52 | 0.1 |

Properties

| Envelope Type | PMU (Full Window) | | PMU (26 × 4 mm Window) | |
|---|---|---|---|---|
| | Red Phosphorescence | Red Fluorescence | Red Phosphorescence | Red Fluorescence |
| A White wove 24 lb. low ink absorbing | >200 | >99 | 41 | 37 |
| B White wove, 24 lb. high ink absorbing | >200 | >99 | 64 | 48 |
| R Recycled green | 68 | 41 | 14 | 8 |

Phosphor Meter Units are measured with an instrument proprietary to U.S. Postal Service a full window is 20×26 mm.

The following data was taken after Datamatrix symbols were printed above the ink preparation of Example 1 with a Hewlett Packard Jet Plus @ 300 DPI using a Hewlett Packard 51626A black ink cartridge.

| | Properties | | |
|---|---|---|---|
| | PMU (Full Window) | | % Error |
| Envelope Type | Red Phosphorescence | Red Fluorescence | Correction Used |
| A White wove 24 lb. low ink absorbing | 77 | 88 | 1.8 |
| B White wove, 24 lb. high ink absorbing | 90 | 120 | 26 |
| R Recycled green | 22 | 38 | 50 |

The higher the value for the % Error Correction used, the more difficult it is for the postal scanner to read the information.

The fluorescent spectral peak is at 612 nm and the phosphorescent spectral peak is at 612 nm.

EXAMPLE 2

Ink Preparation

| Ingredient | Weight % |
|---|---|
| Aqualope Transparent White | 94.9 |
| Lumilux Red CD 331 | 5.0 |
| Acid Red 52 | 0.1 |

Properties

| Envelope Type | PMU (Full Window) | | PMU (26 × 4 mm Window) | |
|---|---|---|---|---|
| | Red Phosphorescence | Red Fluorescence | Red Phosphorescence | Red Fluorescence |
| A White wove 24 lb. low ink absorbing | >200 | >99 | 186 | 70 |
| B White wove 24 lb. high ink absorbing | >200 | >99 | >200 | 79 |
| R Recycled green | >200 | 87 | 59 | 17 |

The following data was taken after Datamatrix symbols were printed above the ink preparation of Example 2 with a Hewlett Packard Jet Plus @ 300 DPI using a Hewlett Packard 51626A black ink cartridge.

| | Properties | | |
|---|---|---|---|
| | PMU (Full Window) | | % Error |
| Envelope Type | Red Phosphorescence | Red Fluorescence | Correction Used |
| A White wove 24 lb. low ink absorbing | >99 | >200 | 47 |
| B White wove, 24 lb. high ink absorbing | >99 | >200 | 57 |
| R Recycled green | 46 | 149 | 29 |

The higher the value for the % Error Correction used, the more difficult it is for the postal scanner to read the information.

The fluorescent spectral peak is at 612 nm and the phosphorescent spectral Is at 612 nm.

EXAMPLE 3

Ink Preparation

| Ingredient | Weight % |
|---|---|
| Aqualope Transparent White | 97.4 |
| Lumilux Red CD 331 | 2.5 |
| Acid Red 52 | 0.1 |

Properties

| | PMU (Full Window) | | PMU (26 × 4 mm Window) | |
|---|---|---|---|---|
| Envelope Type | Red Phosphorescence | Red Fluorescence | Red Phosphorescence | Red Fluorescence |
| A White wove 24 lb. low ink absorbing | >200 | >99 | 162 | 62 |
| B White wove, 24 lb. high ink absorbing | >200 | >99 | 143 | 61 |
| R Recycled green | >200 | >99 | 6 | 21 |

The following data was taken after Datamatrix symbols were printed above the ink preparation of Example 3 with a Hewlett Packard Jet Plus @ 300 DPI using a Hewlett Packard 51626A black ink cartridge.

| | Properties | | |
|---|---|---|---|
| | PMU (Full Window) | | % Error |
| Envelope Type | Red Phosphorescence | Red Fluorescence | Correction Used |
| A White wove 24 lb. low ink absorbing | >99 | >200 | 11 |
| B White wove, 24 lb. high ink absorbing | >99 | >200 | 15 |
| R Recycled green | 59 | 170 | >76 |

The higher the value for the % Error Correction used, the more difficult it is for the postal scanner to read the information. The fluorescent spectral peak is at 612 nm and the phosphorescent spectral peak is at 612 nm.

EXAMPLE 4

Ink Preparation

| Ingredient | Weight % |
|---|---|
| Aqualope Transparent White | 99.4 |
| Lumilux Red CD 331 | 0.6 |

Properties

| | PMU (Full Window) | | PMU (26 × 4 mm Window) | |
|---|---|---|---|---|
| Envelope Type | Red Phosphorescence | Red Fluorescence | Red Phosphorescence | Red Fluorescence |
| A White wove 24 lb. low ink absorbing | >200 | 72 | 84 | 13 |
| B White wove, 24 lb. | >200 | >99 | 111 | 18 |

| | -continued | | | |
|---|---|---|---|---|
| high ink absorbing | | | | |
| R Recycled green | 62 | 10 | 10 | 1 |

Phosphor Meter Units are measured with an instrument proprietary to U.S. Postal Service a full window is 20×26 mm.

The following data was taken after Datamatrix symbols were printed above the ink preparation of Example 4 with a Hewlett Packard Jet Plus @ 300 DPI using a Hewlett Packard 51626A black ink cartridge.

| | Properties | | |
|---|---|---|---|
| | PMU (Full Window) | | % Error |
| Envelope Type | Red Phosphorescence | Red Fluorescence | Correction Used |
| A White wove 24 lb. low ink absorbing | 33 | >200 | 20 |
| B White wove, 24 lb. high ink absorbing | 44 | >200 | 29 |
| R Recycled green | 4 | 25 | 44 |

The higher the value for the % Error Correction used, the more difficult it is for the postal scanner to read the information. The fluorescent spectral peak is at 612 nm and the phosphorescent spectral peak is at 612 nm.

EXAMPLE 5

Ink Preparation

| Ingredient | Weight % |
|---|---|
| Aqualope Transparent White | 95 |
| Lumilux Red CD 331 | 5 |

Properties

| | PMU (Full Window) | | PMU (26 × 4 mm Window) | |
|---|---|---|---|---|
| Envelope Type | Red Phosphorescence | Red Fluorescence | Red Phosphorescence | Red Fluorescence |
| A White wove 24 lb. low ink absorbing | >200 | >99 | >200 | 62 |
| B White wove, 24 lb. high ink absorbing | >200 | >99 | >200 | 67 |
| R Recycled green | >200 | 65 | 58 | 10 |

Phosphor Meter Units are measured with an instrument proprietary to U.S. Postal Service a full window is 20×26 mm.

The following data was taken after Datamatrix symbols were printed above the ink preparation of Example 5 with a Hewlett Packard Jet Plus @ 300 DPI using a Hewlett Packard 51626A black ink cartridge.

| | Properties | | |
|---|---|---|---|
| | PMU (Full Window) | | % Error |
| Envelope Type | Red Phosphorescence | Red Fluorescence | Correction Used |
| A White wove 24 lb. low ink absorbing | >200 | >99 | 10 |
| B White wove, 24 lb. high ink absorbing | >200 | >99 | 45 |
| R Recycled green | 179 | 32 | 24 |

The fluorescent spectral peak is at 612 nm and the phosphorescent spectral peak is at 612 nm.

EXAMPLE 6
Ink Preparation

| Ingredient | Weight % |
|---|---|
| Aqualope Transparent White | 97.5 |
| Lumilux Red CD 331 | 2.5 |

Properties

| | PMU (Full Window) | | PMU (26 × 4 mm Window) | |
|---|---|---|---|---|
| Envelope Type | Red Phosphorescence | Red Fluorescence | Red Phosphorescence | Red Fluorescence |
| A White wove 24 lb. low ink absorbing | >200 | >99 | >200 | 55 |
| B White wove, 24 lb. high ink absorbing | >200 | >99 | >200 | 61 |
| R Recycled green | >200 | 71 | 71 | 13 |

Phosphor Meter Units are measured with an instrument proprietary to U.S. Postal Service a full window is 20×26 mm.

The following data was taken after Datamatrix symbols were printed above the ink preparation of Example 6 with a Hewlett Packard Jet Plus @ 300 DPI using a Hewlett Packard 51626A black ink cartridge.

| | Properties | | |
|---|---|---|---|
| | PMU (Full Window) | | % Error |
| Envelope Type | Red Phosphorescence | Red Fluorescence | Correction Used |
| A White wove 24 lb. low ink absorbing | >200 | >99 | 8 |
| B White wove, 24 lb. high ink absorbing | >200 | >99 | 33 |
| R Recycled green | 160 | 30 | 2 |

The higher the value for the % Error Correction used, the more difficult it is for the postal scanner to read the information.

The fluorescent spectral peak is at 612 nm and the phosphorescent spectral peak is at 612 nm.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A system for printing information on a mail piece, said system comprises:

printing a portion of the object with a dual luminescent ink;

an information-based indicia (IBI) that does not have a Facing Identification Mark (FIM); and printing over the dual luminescent ink with a colored ink so that detectors of a facer canceller will recognize the IBI as the IBI even though an FIM is not present.

2. The system of claim 1, wherein the dual luminescent ink is both fluorescent and phosphorescent when radiated with ultra violet light having a wavelength of 254 nm.

3. The system claimed in claim 2, wherein the dual luminescent ink will have a fluorescent spectral peak at 612 nm and a phosphorescent spectral peak at 612 nm.

4. The system of claim 1, wherein the colored ink is a black ink.

5. The system of claim 1, wherein the dual luminescent ink composition consists essentially of:

95.0 (wt %) to 99.4 (wt %) Aqualope Transparent White; and 0.6 (wt %) to 5.0 (wt %) Lumilux Red CD 331.

6. The system of claim 1, wherein the dual luminescent ink composition consists essentially of:

94.9 (wt %) to 99.3 (wt %) Aqualope Transparent White;

0.6 (wt %) to 5.0 (wt %) Lumilux Red CD 331; and 0.1 (wt %) Acid Red 52.

* * * * *